US012346126B2

United States Patent
Kanai et al.

(10) Patent No.: US 12,346,126 B2
(45) Date of Patent: Jul. 1, 2025

(54) VEHICLE MANAGEMENT SYSTEM

(71) Applicant: Hitachi Construction Machinery Co., Ltd., Tokyo (JP)

(72) Inventors: Masaki Kanai, Tokyo (JP); Tomoyuki Hamada, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 225 days.

(21) Appl. No.: 18/023,817

(22) PCT Filed: Nov. 4, 2021

(86) PCT No.: PCT/JP2021/040641
§ 371 (c)(1),
(2) Date: Feb. 28, 2023

(87) PCT Pub. No.: WO2022/097688
PCT Pub. Date: May 12, 2022

(65) Prior Publication Data
US 2023/0324928 A1    Oct. 12, 2023

(30) Foreign Application Priority Data
Nov. 6, 2020   (JP) .................. 2020-185835

(51) Int. Cl.
*G05D 1/00* (2024.01)
*B60K 35/00* (2024.01)
(Continued)

(52) U.S. Cl.
CPC .......... *G05D 1/0297* (2013.01); *B60K 35/00* (2013.01); *E02F 9/264* (2013.01); *B60K 35/10* (2024.01)

(58) Field of Classification Search
None
See application file for complete search history.

(56) References Cited

U.S. PATENT DOCUMENTS 6,044,312 A    3/2000   Sudo et al.
9,823,082 B2   11/2017  Lewis et al.
(Continued)

FOREIGN PATENT DOCUMENTS

AU    2009200526 A1    9/2009
JP    8-263138 A       10/1996
(Continued)

OTHER PUBLICATIONS

Extended European Search Report issued in European Application No. 21889240.4 dated Sep. 30, 2024 (8 pages).
(Continued)

*Primary Examiner* — Todd Melton
(74) *Attorney, Agent, or Firm* — Crowell & Moring LLP

(57) ABSTRACT

A vehicle management system 1 includes an unmanned vehicle 20 capable of autonomous traveling, a loading machine 10 performing a loading work for the unmanned vehicle 20, and a management station 30 performing dispatch management and traffic control of the unmanned vehicle 20. The loading machine 10 includes a bucket tip position calculator 111 that calculates a bucket tip position of a bucket based on information on a position, an orientation, and an angle of each joint of the loading machine. The management station 30 includes an unmanned vehicle instruction section 313 that calculates a loading zone of the unmanned vehicle 20 and issues a calling instruction or a departure instruction to the unmanned vehicle 20 based on the calculated loading zone and the bucket tip position of the loading machine 10.

7 Claims, 16 Drawing Sheets

(51) Int. Cl.
*B60K 35/10* (2024.01)
*E02F 9/26* (2006.01)

(56) References Cited

U.S. PATENT DOCUMENTS

| | | | |
|---|---|---|---|
| 10,048,692 B2* | 8/2018 | Hamada | .................... E02F 9/26 |
| 10,635,112 B2* | 4/2020 | Kobashi | ............... G05D 1/0297 |
| 11,892,836 B2* | 2/2024 | Whitfield, Jr. | ....... G05D 1/0276 |
| 2012/0136507 A1* | 5/2012 | Everett | ................... E02F 9/262 |
| | | | 701/2 |
| 2019/0367030 A1 | 12/2019 | Tanaka et al. | |
| 2022/0290402 A1* | 9/2022 | Okada | .................. G05D 1/0027 |

FOREIGN PATENT DOCUMENTS

| | | |
|---|---|---|
| JP | 2016-193691 A | 11/2016 |
| WO | WO 2015/087382 A1 | 6/2015 |
| WO | WO 2018/155709 A1 | 8/2018 |

OTHER PUBLICATIONS

International Search Report (PCT/ISA/210) issued in PCT Application No. PCT/JP2021/040641 dated Jan. 25, 2022 with English translation (four (4) pages).
Japanese-language Written Opinion (PCT/ISA/237) issued in PCT Application No. PCT/JP2021/040641 dated Jan. 25, 2022 (four (4) pages).
Australian Office Action issued in Australian Application No. 2021375694 dated Nov. 28, 2023 (7 pages).

* cited by examiner

Fig. 4A

| Vehicle ID | Travel Route | | |
|---|---|---|---|
| | Area Exit Side Route | Conveyance Route | Area Entrance Side Route |
| vehicle_1 | node_LP~node_Lout | node_Lout~node_Din | node_Din~node_DP |
| vehicle_2 | node_LP~node_Lout | node_Lout~node_Din | node_Din~node_DP |
| ... | ... | ... | ... |
| ... | ... | ... | ... |
| ... | ... | ... | ... |
| vehicle_m | node_DP~node_Dout | node_Dout~node_Lin | node_Lin~node_LP |
| vehicle_m+1 | node_DP~node_Dout | node_Dout~node_Lin | node_Lin~node_LP |

Fig. 4B

| Node ID | Travel-permitted Vehicle |
|---|---|
| node1 | vehicle_1 |
| node2 | vehicle_1 |
| node3 | null |
| ... | ... |
| node_n | vehicle_2 |
| node_n+1 | vehicle_3 |
| node_n+2 | null |

Fig. 15
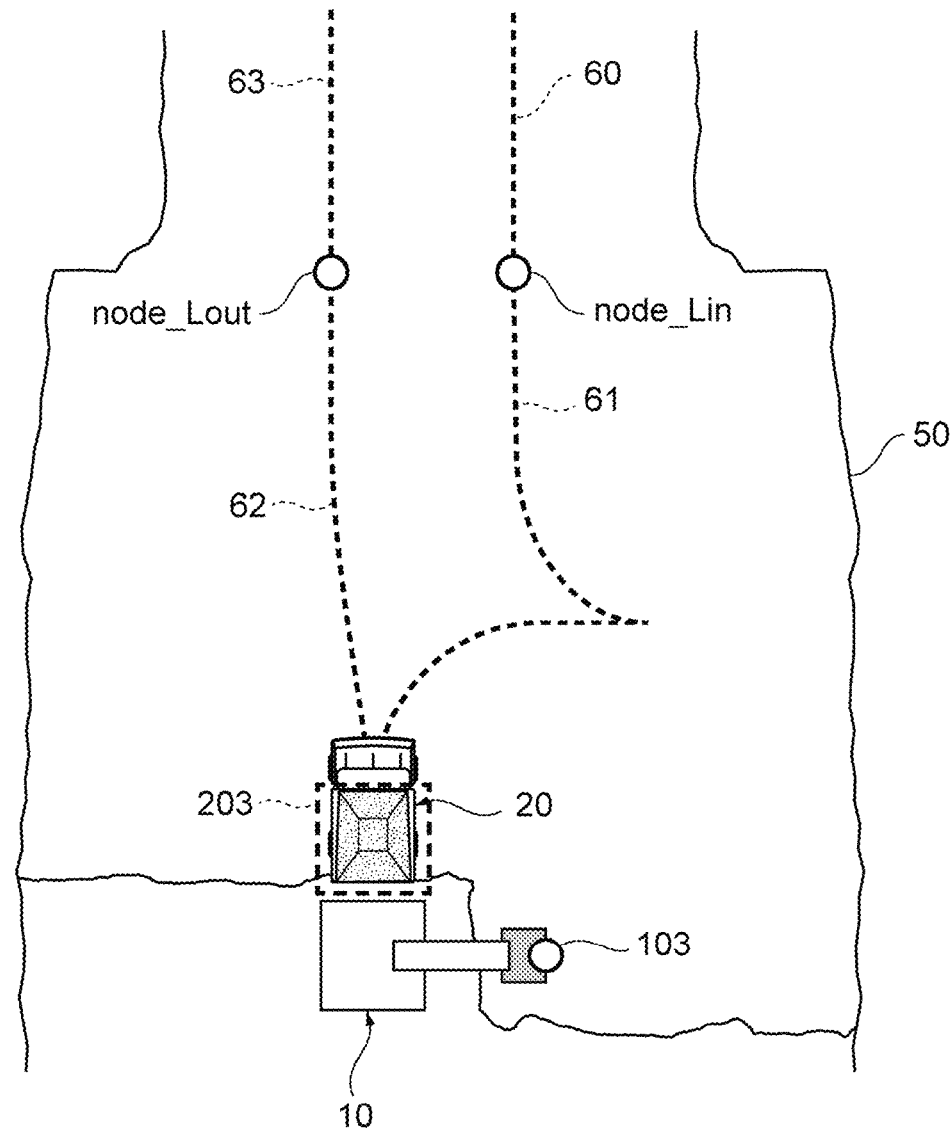
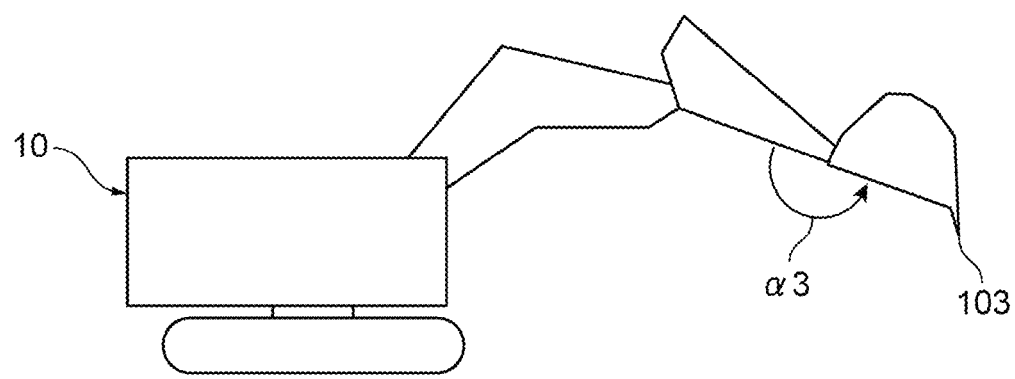

VEHICLE MANAGEMENT SYSTEM

TECHNICAL FIELD

The present invention relates to a vehicle management system and especially relates to a vehicle management system in a site where a loading machine performs a loading work for an unmanned vehicle. The present application claims priority from Japanese patent application JP 2020-185835 filed on Nov. 6, 2020, the entire content of which is hereby incorporated by reference into this application.

BACKGROUND ART

In a strip mine or the like, a vehicle management system including dump trucks that autonomously travel without an operator on board (namely, unmanned vehicle) and a management station that communicates with the unmanned vehicles via a wireless communication line is employed. In the vehicle management system, a loading machine, such as a shovel operated by an operator performs a loading work that loads, earth, sand, ores, and the like (hereinafter referred to as "earth and sand") on the unmanned vehicle. Since any operator is not on board the unmanned vehicle, an operator of the loading machine needs to issue a calling instruction to a loading position to the unmanned vehicle and a departure instruction after the loading in addition to operation of the loading machine itself, thus requiring a more complicated procedure. Therefore, in order to achieve a high productivity in a vehicle management system, a mechanism that facilitates an operator of a loading machine to perform an effective work is required.

As a mechanism that calls an unmanned vehicle to a loading position efficiently, as illustrated in, for example, Patent Literature 1 below, a method that uses a position and an orientation of an unmanned vehicle and a position and an orientation of a loading point and guides a travel route to the loading point based on differences in the position and the orientation thereof is known.

CITATION LIST

Patent Literature

Patent Literature 1: U.S. Pat. No. 9,823,082

SUMMARY OF INVENTION

Technical Problem

With the method described in Patent Literature 1 above, an instruction of the loading position by an operator of the loading machine allows efficient guidance of the unmanned vehicle. However, it is not possible to issue a departure instruction to the unmanned vehicle efficiently. Since functions of sounding an alarm, turning ON/OFF of a wireless call, and the like are allocated to switches of an operating lever of a loading machine, there is little room for an instruction function to an unmanned vehicle. Granting that a switch for the instruction function to the unmanned vehicle is added, the addition may induce erroneous operation especially for inexperienced operators, thus ending up with a decreased work efficiency. In view of this, there has been a problem that it is difficult to improve efficiency of the loading work for the unmanned vehicle by an operator of the loading machine.

The present invention has been made to solve the above-described technical problems, and an object of the present invention is to provide a vehicle management system that allows improving efficiency of the loading work for the unmanned vehicle by an operator of the loading machine.

Solution to Problem

A vehicle management system according to the present invention is provided. In the vehicle management system, an unmanned vehicle, a loading machine, and a management station are configured to be communicative with one another. The unmanned vehicle is capable of autonomous traveling, a bucket is mounted on the loading machine by an articulated structure, the loading machine performs a loading work for the unmanned vehicle, and the management station performs dispatch management and traffic control of the unmanned vehicle. The vehicle management system comprises a vehicle information management section, an autonomous traveling control section, a bucket tip position calculator, a machine information management section, and an unmanned vehicle instruction section. The vehicle information management section obtains and stores information on a position, an orientation, and a tray dimension of the unmanned vehicle, and transmits the information to the management station. The autonomous traveling control section controls a travel of the unmanned vehicle based on instruction from the management station. The bucket tip position calculator calculates a bucket tip position of the bucket based on information on a position, an orientation, and an angle of each joint of the loading machine. The machine information management section obtains and stores the bucket tip position calculated by the bucket tip position calculator, and transmits information on the bucket tip position to the management station. The unmanned vehicle instruction section calculates a loading zone of the unmanned vehicle based on the information on the position, the orientation, and the tray dimension of the unmanned vehicle transmitted from the vehicle information management section, and issues a calling instruction or a departure instruction to the unmanned vehicle based on the calculated loading zone and the bucket tip position transmitted from the machine information management section.

In the vehicle management system according to the present invention, the unmanned vehicle instruction section issues the calling instruction or the departure instruction to the unmanned vehicle based on the information on the bucket tip position calculated from the position, the orientation, and the angle of each joint of the loading machine and the loading zone of the unmanned vehicle calculated from the position, the orientation, and the tray dimension of the unmanned vehicle. This reduces the workload of an operator of the loading machine, and thus improves efficiency of the loading work for the unmanned vehicle by the operator of the loading machine.

Advantageous Effects of Invention

The present invention allows improving efficiency of the loading work for the unmanned vehicle by an operator of the loading machine.

BRIEF DESCRIPTION OF DRAWINGS

FIG. 4A is a diagram showing an exemplary table of a dispatch management information.

FIG. 4B is a diagram showing an exemplary table of a management control information.

FIG. 15 is a diagram for describing the situation where the departure instruction is issued to the unmanned vehicle.

DESCRIPTION OF EMBODIMENTS

Figure 1:
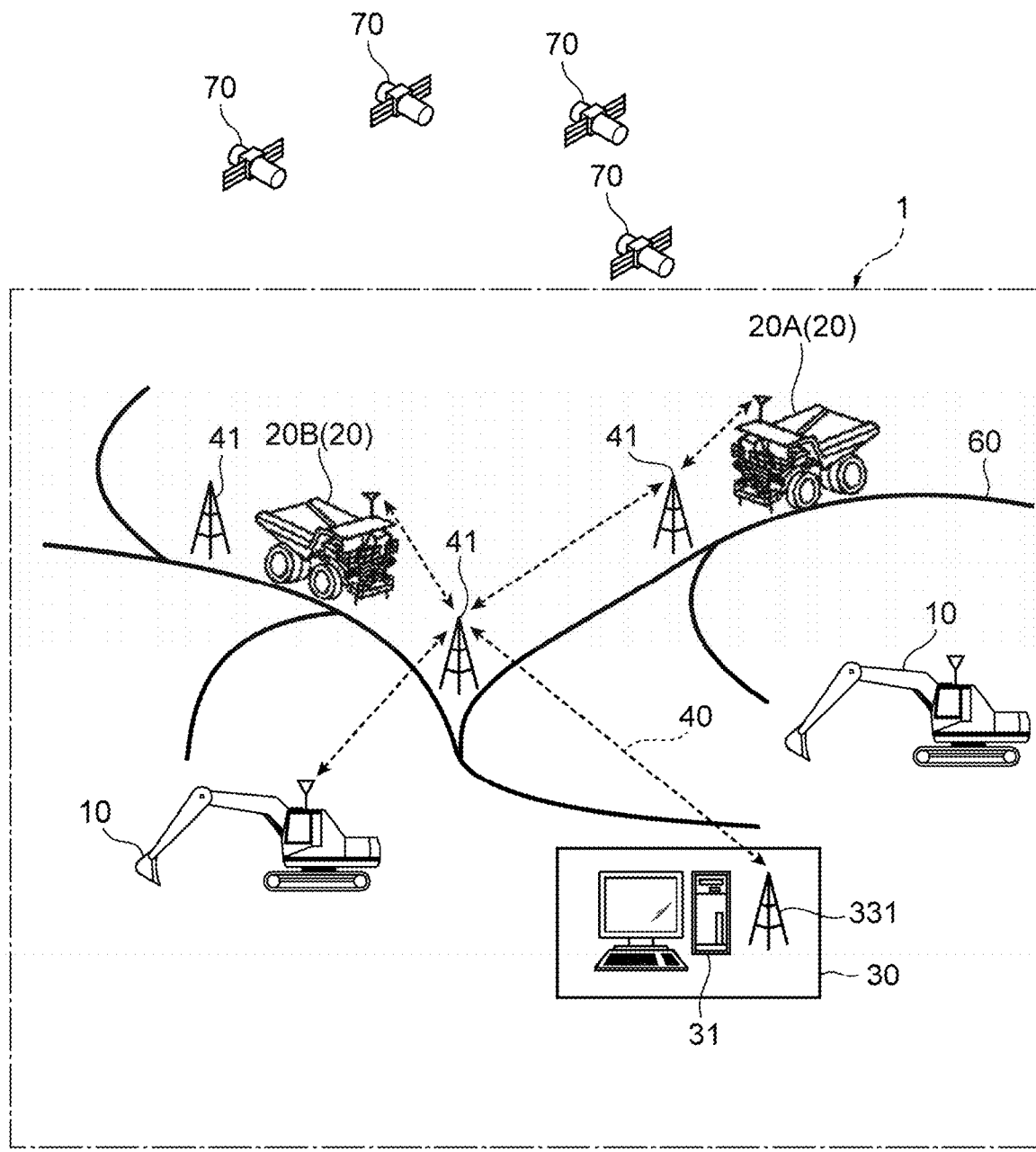
FIG. 1 is a schematic configuration diagram illustrating a vehicle management system according to a first embodiment.

The following describes embodiments of a vehicle management system according to the present invention with reference to the drawings. In the description of the drawings, the same reference numerals are attached to the components having the same functions and the repeated description is omitted.

First Embodiment

FIG. 1 is a schematic configuration diagram illustrating the vehicle management system according to the first embodiment. As shown in FIG. 1, a vehicle management system 1 in the embodiment is a system employed in a work site such as a strip mine or the like. The vehicle management system 1 includes one or more loading machines 10 performing the excavation work and the loading work, one or more unmanned vehicles 20 (unmanned vehicle 20A, unmanned vehicle 20B) conveying earth and sand loaded from the loading machines 10, and a management station 30 performing dispatch management and traffic control of the unmanned vehicles 20. The loading machines 10, the unmanned vehicles 20 and the management station 30 are configured to be communicative with one another via a wireless communication line 40. Specifically, a plurality of wireless base stations 41 are installed in the strip mine or the like, and the loading machines 10, the unmanned vehicles 20 and the management station 30 transmit and receive information with one another via the wireless base stations 41.

In this embodiment, as a traffic control method of the management station 30, a so-called travel-permitted section control method is employed, in which a partial section of a conveyance route 60 divided by nodes on map data showing the conveyance route 60 is exclusively permitted to travel based on the position of each unmanned vehicle 20. In the travel-permitted section control method, for example, when a travel permission is requested for a forward section adjacent to a travel-permitted section of an own vehicle, in the case where the requested forward section is permitted for other vehicles to travel or is set as a no-entry section, the own vehicle is not permitted to travel in the forward section. Therefore, the own vehicle stops at a terminating end of the section that is currently permitted and stands by until the traveling of the forward section is permitted.

Figure 2:
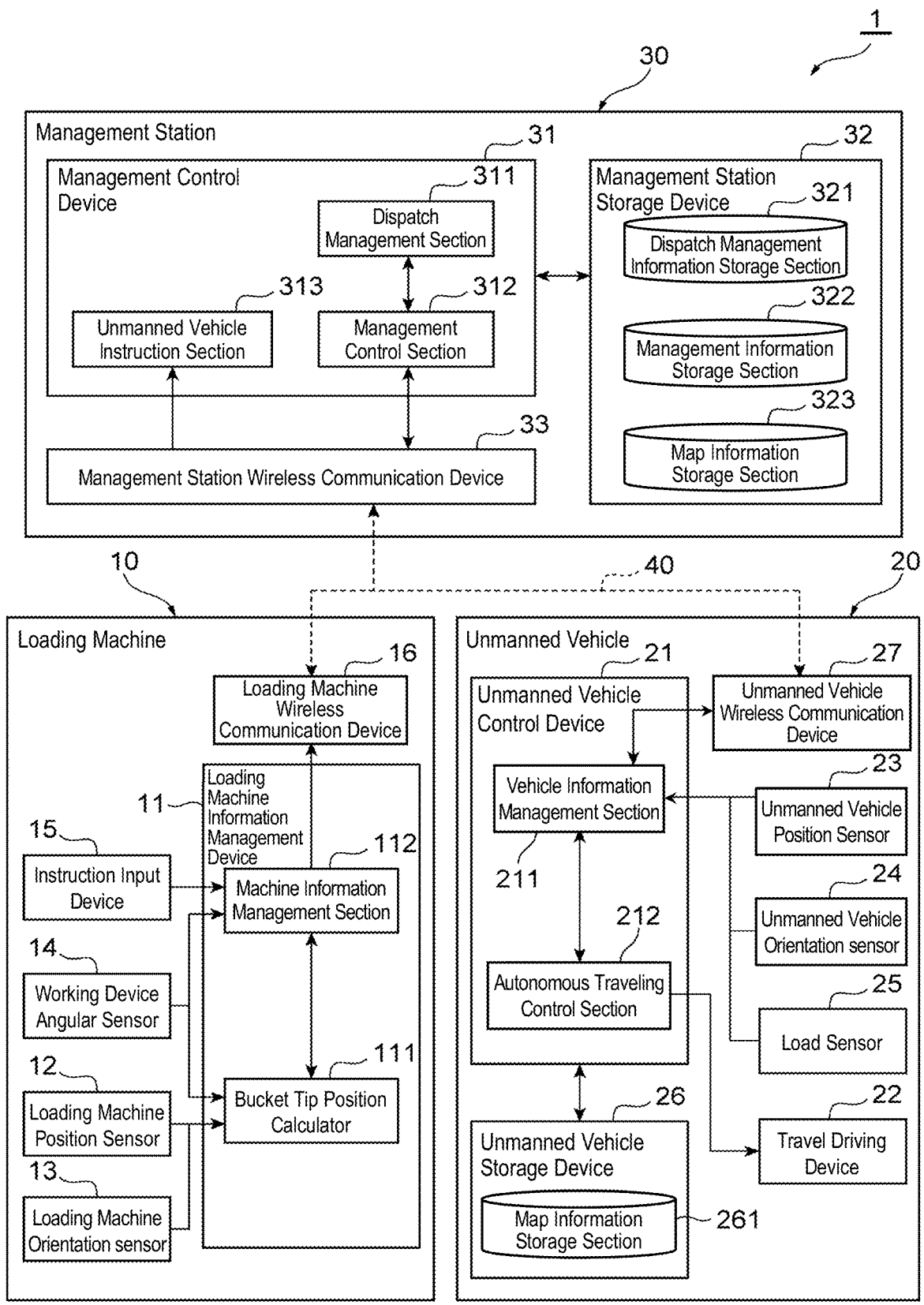
FIG. 2 is a function block diagram illustrating the vehicle management system according to the first embodiment.

FIG. 2 is a function block diagram illustrating the vehicle management system according to the first embodiment. While one loading machine 10 and one unmanned vehicle 20 are shown in FIG. 2, the same configurations are each adopted when there are two or more loading machines 10 and unmanned vehicles 20.

Loading Machine

The loading machine 10 is a machine in which a bucket is mounted by an articulated structure. The loading machine 10 of the embodiment is, for example, a backhoe such as a hydraulic excavator having a working device disposed turnably in a vertical direction with respect to the machine main body. The working device includes a boom, an arm, the bucket and the like. The loading machine 10 is not limited to the hydraulic excavator and may be, for example, a wheel loader or the like.

The loading machine 10 includes a loading machine information management device 11, a loading machine position sensor 12, a loading machine orientation sensor 13, a working device angular sensor 14, an instruction input device 15, and a loading machine wireless communication device 16.

The loading machine position sensor 12 is, for example, a Global Positioning System (GPS), and measures a position of the loading machine 10 and outputs the measured position to the loading machine information management device 11. As a device for measuring the position of the loading machine 10, instead of the loading machine position sensor 12, for example, a device for measuring the position of the loading machine 10 by receiving positioning radio waves from a plurality of navigation satellites 70 (see FIG. 1) may be used.

The loading machine orientation sensor 13 measures an orientation of the loading machine 10 and outputs the measured orientation to the loading machine information management device 11. The loading machine orientation sensor 13 may be, for example, a dual-antenna GPS that has two antennas and measures the orientation based on the relative position between the antenna positions obtained by the respective antennas, or may be an orientation sensor using magnetism.

The working device angular sensor 14 measures a relative angle of each joint of the working device such as the boom, the arm, and the bucket. Specifically, the working device angular sensor 14 measures a relative angle between the machine main body and the boom, a relative angle between the boom and the arm, and a relative angle between the arm and the bucket, and outputs the measured angles to the loading machine information management device 11. The working device angular sensor 14 is, for example, a potentiometer mounted to each joint.

Figure 3:
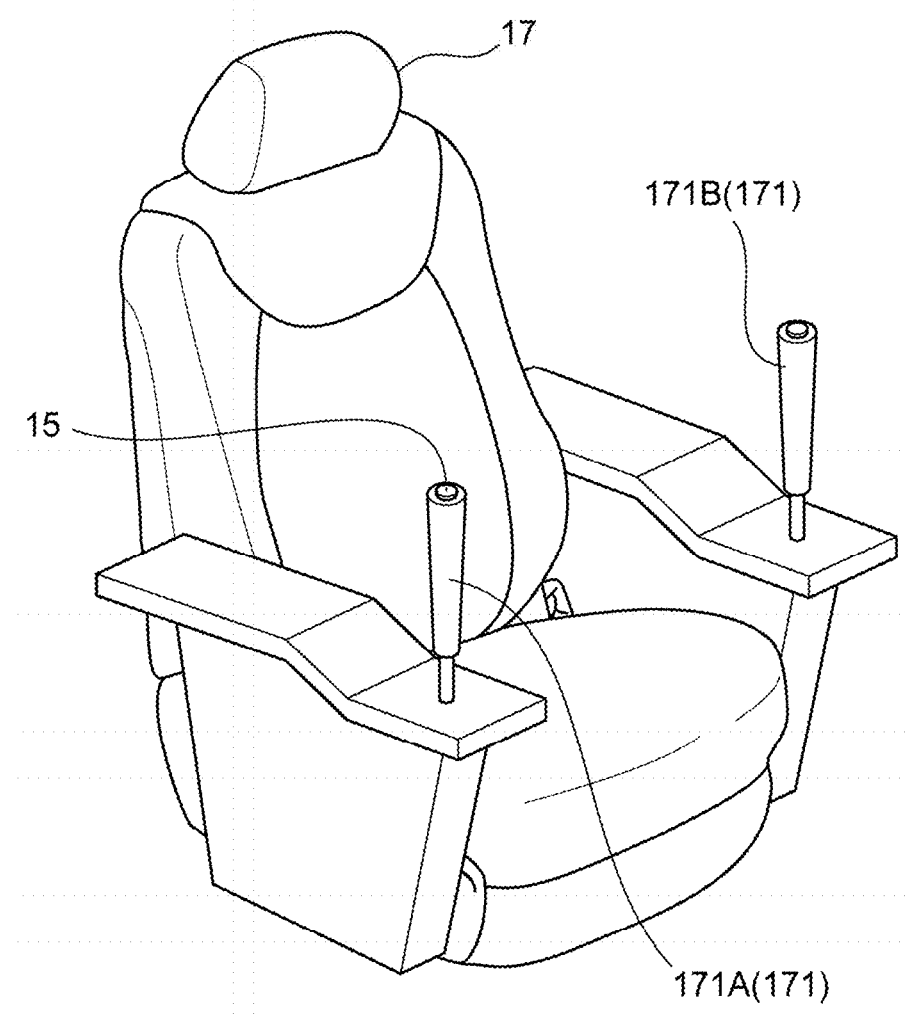
FIG. 3 is a diagram illustrating an overview of an operator seat of the loading machine.

The instruction input device 15 is a device to input an instruction to the unmanned vehicle 20 by an operator of the loading machine 10, and is connected to the loading machine information management device 11. The instruction input device 15 is, for example, a switch or the like disposed at an operator seat 17 so as to be easily operated by the operator. Specifically, as shown in FIG. 3, a pair of operating levers 171 (operating levers 171A and 171B), which can be gripped by the left and right hands when the operator is seated, are mounted on the operator seat 17 disposed in the cab of the loading machine 10. The operator can operate the boom, the arm, the bucket, and the like of the loading machine 10 via the operating levers 171. The instruction input device 15 is arranged on the top of the operating lever 171 as a switch that can be operated quickly at all times, for example, by the thumb of the right hand while the operating lever 171 is gripped.

The instruction input device 15 is not necessarily the switch arranged on the top of the operating lever 171, and may be a device other than the switch as long as the operator can easily input the instruction to the unmanned vehicle 20 while performing usual operations such as loading. In addition, the location of the instruction input device 15 is not limited to the top of the operating lever 171.

The loading machine wireless communication device 16 is, for example, a wireless device for connecting to the wireless communication line 40. The loading machine wireless communication device 16 transmits and receives information to and from the unmanned vehicle 20 or the management station 30 via the wireless communication line 40.

The loading machine information management device 11 is configured as a microcomputer made of a combination of, for example, a Central Processing Unit (CPU) performing operations, a Read Only Memory (ROM) as a secondary storage device in which a program for the operations is stored, and a Random Access Memory (RAM) as a temporary storage device storing operation progress and a temporary control variable. The loading machine information management device 11 controls an operation of the loading machine 10 by executing the stored program.

The loading machine information management device 11 includes a bucket tip position calculator 111 and a machine information management section 112. The bucket tip position calculator 111 geometrically calculates a bucket tip position of the bucket based on the position information output from the loading machine position sensor 12, the orientation information output from the loading machine orientation sensor 13, and the information on the angle of each joint output from the working device angular sensor 14. Further, the bucket tip position calculator 111 outputs the calculated bucket tip position to the machine information management section 112.

The machine information management section 112 obtains and stores information on the bucket tip position calculated by the bucket tip position calculator 111, and transmits the information on the bucket tip position to the management station 30 via the loading machine wireless communication device 16. When the instruction input device 15 receives an instruction input, the machine information management section 112 further generates operation instruction information to the unmanned vehicle 20 (hereinafter referred to as an "unmanned vehicle operation instruction information") in response to the instruction input, and transmits the generated unmanned vehicle operation instruction information together with the information on the bucket tip position to the management station 30.

Further, the machine information management section 112 may further obtain and store the information on the angle of each joint in addition to the information on the bucket tip position. In this case, the machine information management section 112 transmits the information on the bucket tip position and the angle of each joint to the management station 30 via the loading machine wireless communication device 16.

Unmanned Vehicle

The unmanned vehicle 20 is, for example, a dump truck capable of autonomous traveling based on the instruction from the management station 30. The unmanned vehicle 20 includes an unmanned vehicle control device 21, a travel driving device 22, an unmanned vehicle position sensor 23, an unmanned vehicle orientation sensor 24, a load sensor 25, an unmanned vehicle storage device 26, and an unmanned vehicle wireless communication device 27.

The travel driving device 22 drives the traveling of the unmanned vehicle 20 based on a control signal from the unmanned vehicle control device 21. The travel driving device 22 includes, for example, a steering motor for changing a steering angle of the unmanned vehicle 20, a traveling motor to cause the unmanned vehicle 20 to travel, a brake, and the like.

The unmanned vehicle position sensor 23 is, for example, a GPS device or the like, and measures the position of the own vehicle and outputs the measured position to the unmanned vehicle control device 21. The unmanned vehicle position sensor 23 may be a combination of a GPS and an Inertial Measurement Unit (IMU), or a sensor that identifies the position using radio waves from a base station installed on the ground.

The unmanned vehicle orientation sensor 24 is, for example, a GPS device or a sensor using magnetism, and measures an orientation of the unmanned vehicle 20 and outputs the measured orientation to the unmanned vehicle control device 21.

The load sensor 25 measures a weight (that is, loaded amount) of a loading cargo loaded on the unmanned vehicle 20. The load sensor 25 may be a weight sensor disposed on a seating portion of the tray, or may be a sensor that estimates the weight based on the pressures of suspension cylinders interposed between the vehicle body; and the front, rear, right and left wheels. The load sensor 25 outputs the measured the loaded amount to the unmanned vehicle control device 21.

The unmanned vehicle storage device 26 is a non-volatile storage medium that can read and write information, and stores an Operating System (OS), various kinds of control programs, application programs, database and the like. The unmanned vehicle storage device 26 has a map information storage section 261.

The unmanned vehicle wireless communication device 27 is, for example, a wireless device for connecting to the wireless communication line 40. The unmanned vehicle wireless communication device 27 transmits and receives information to and from the loading machine 10 or the management station 30 via the wireless communication line 40.

The unmanned vehicle control device 21 is configured as a microcomputer made of a combination of, for example, a Central Processing Unit (CPU) performing operations, a Read Only Memory (ROM) as a secondary storage device in which a program for the operations is stored, and a Random Access Memory (RAM) as a temporary storage device storing operation progress and a temporary control variable. The unmanned vehicle control device 21 controls an operation of the unmanned vehicle 20 by executing the stored program.

The unmanned vehicle control device 21 includes a vehicle information management section 211 and an autonomous traveling control section 212. The vehicle information management section 211 obtains and stores position information output from the unmanned vehicle position sensor 23, orientation information output from the unmanned vehicle orientation sensor 24, and loaded amount information output from the load sensor 25, and transmits the information to the management station 30 via the unmanned vehicle wireless communication device 27. The vehicle information management section 211 outputs the above-described information on the position, the orientation, and the loaded amount to the autonomous traveling control section 212. Further, when receiving information on the travel route and the travel-permitted section to the own vehicle from a management control section 312 (described later) of the management station 30, the vehicle information management section 211 outputs the received information to the autonomous traveling control section 212.

The autonomous traveling control section 212 generates acceleration/deceleration control signals and a steering control signal for causing the unmanned vehicle 20 to travel without deviating from the travel-permitted section while following the travel-permitted route, based on the information on the position, the orientation, the loaded amount, the travel route, and the travel-permitted section output from the vehicle information management section 211. Further, the autonomous traveling control section 212 outputs the generated control signals to the travel driving device 22.

Management Station 30

The management station 30 includes a management control device 31, a management station storage device 32, and a management station wireless communication device 33. The management station storage device 32 is a non-volatile storage medium that can read and write information, and stores an Operating System (OS), various kinds of control programs, application programs, database and the like. The management station storage device 32 has a dispatch management information storage section 321, a management information storage section 322, and a map information storage section 323.

The management station wireless communication device 33 is, for example, a wireless device for connecting to the wireless communication line 40, and has an antenna 331 (see FIG. 1). The management station wireless communication device 33 transmits and receives information to and from the loading machine 10 or the unmanned vehicle 20 via the wireless communication line 40.

The management control device 31 is configured as a microcomputer made of a combination of, for example, a Central Processing Unit (CPU) performing operations, a Read Only Memory (ROM) as a secondary storage device in which a program for the operations is stored, and a Random Access Memory (RAM) as a temporary storage device storing operation progress and a temporary control variable. The management control device 31 controls an operation of the management station 30 by executing the stored program.

The management control device 31 includes a dispatch management section 311, the management control section 312, and an unmanned vehicle instruction section 313. The dispatch management section 311 sets a travel route to the destination of the unmanned vehicle 20. For example, when the unmanned vehicle 20 is in the loading site, the dispatch management section 311 sets a travel route to the dumping site. On the other hand, when the unmanned vehicle 20 is in the dumping site, the dispatch management section 311 sets a travel route to the loading site. The travel route set by the dispatch management section 311 is stored in the dispatch management information storage section 321 as dispatch management information, for example, in a table format.

FIG. 4A is a diagram showing an exemplary table of a dispatch management information. As shown in FIG. 4A, in the dispatch management information, the travel route set by the dispatch management section 311 is stored for each vehicle ID uniquely identifying the unmanned vehicle. The travel route is constituted of an area exit side route, a conveyance route, and an area entrance side route. The conveyance route indicates the route from a loading site exit point node_Lout to a dumping site entry point node_Din, or from a dumping site exit point node_Dout to a loading site entry point node_Lin, that is, the route on a conveyance path.

The area entrance side route indicates the route from the loading site entry point node_Lin to a loading position node_LP, or from the dumping site entry point node_Din to a dumping position node_DP, that is, the route from a work area entrance to a work point. The area exit side route indicates the route from the loading position node_LP to the loading site exit point node_Lout, or from the dumping position node_DP to the dumping site exit point node_Dout, that is, the route from the work point to the work area exit point. Each of the routes is defined as a coordinate point sequence (node sequence) for the unmanned vehicle 20 to follow as a target track. In this embodiment, the area entrance side route and the area exit side route are collectively referred to as an "in-area route."

Among the travel routes, conveyance path map information that can be set as a conveyance route is stored in advance in the map information storage section 323 in a format corresponding to the shape of the conveyance path. On the other hand, in-area map information that can be set as the in-area route is generated by the management control section 312 and stored in the map information storage section 323 when the loading position or the dumping position as the work point is specified. Only one or a plurality of pieces of the in-area map information may be generated with respect to the same work area. In the case where a plurality of pieces of the in-area map information are generated, the dispatch management section 311 may select one of the plurality of pieces of the in-area map information to set the in-area route when setting the travel route for the unmanned vehicle 20.

When setting the travel route for the unmanned vehicle 20, in the case where there is an in-area route generated for the work area of the destination, the dispatch management section 311 sets the conveyance route and the in-area route simultaneously. On the other hand, when there are no in-area routes generated for the work area of the destination, the dispatch management section 311 may first set the conveyance route to the work area entry point as the destination, and set the in-area route at the point when the work point in the area is specified and the in-area map information is generated.

The management control section 312 sets some sections of the travel route of the unmanned vehicle 20 as the travel-permitted section in which travel permission is given only to the unmanned vehicle 20, based on traffic control information (hereinafter simply referred to as a "control information") stored in the management information storage section 322. FIG. 4B is a diagram showing an exemplary table of the control information stored in the management information storage section. In the control information, a node ID is associated with a "travel-permitted vehicle" indicating an unmanned vehicle to which travel permission is given with respect to the section (section to the next node on the route) indicated by each node ID. The management control section 312 sets the forward section in which traveling is permitted as the travel-permitted section for the unmanned vehicle 20 according to the position of the unmanned vehicle 20. The unmanned vehicle 20 travels in accordance with the node of the set section.

As described above, in this embodiment, the travel-permitted section control method is employed. Therefore, when the forward section in the travel-permitted section set for one unmanned vehicle 20A is set as the travel-permitted section for another unmanned vehicle 20B, the management control section 312 does not permit the unmanned vehicle 20A to travel in the forward section. In this case, the unmanned vehicle 20A stops so as not to exceed the terminal node of the travel-permitted section that is currently permitted, and stands by until the traveling of the forward section is permitted.

Figure 5:
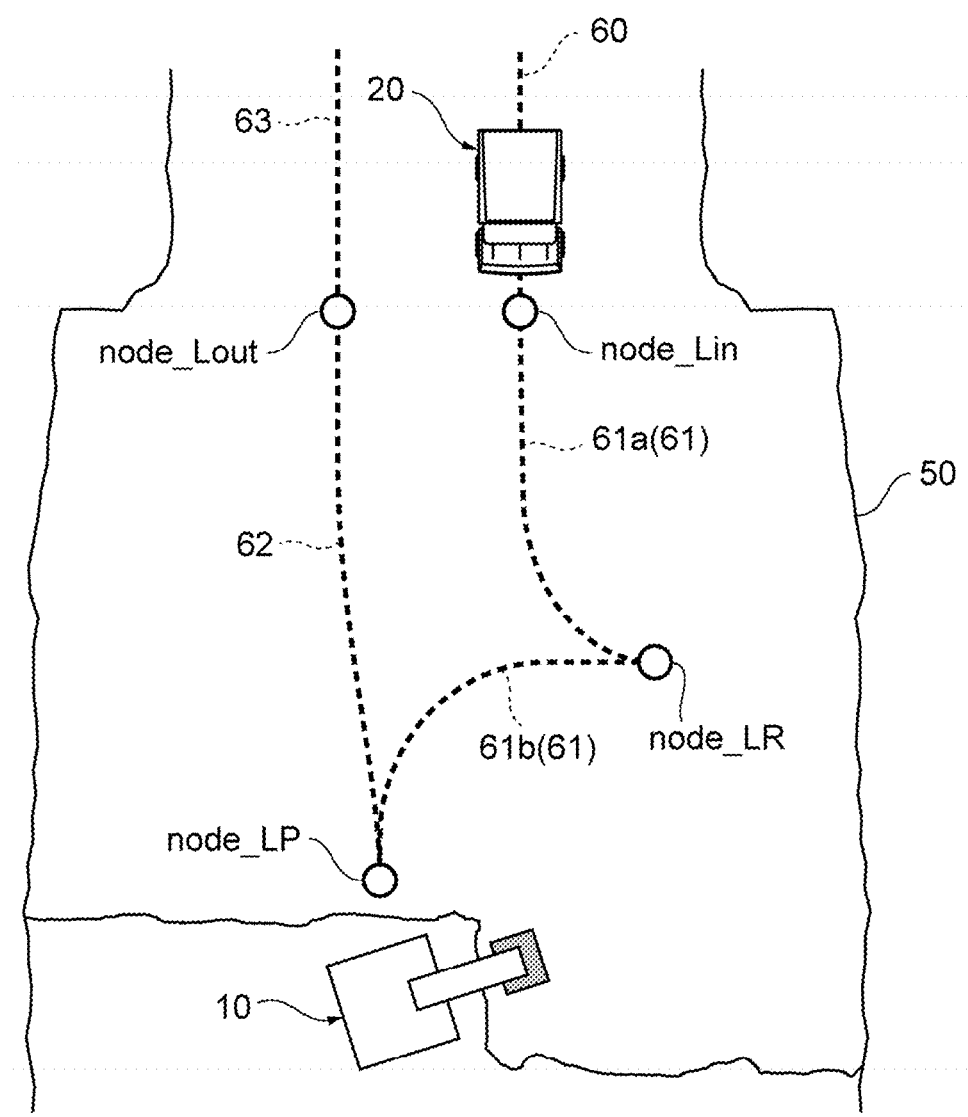
FIG. 5 is a diagram illustrating a generation of an in-area route in a loading site.

The management control section 312 generates the in-area map information based on the work point specified in the work area, and stores the generated in-area map information in the map information storage section 323. For example, as shown in FIG. 5, when the loading position node_LP is specified in a loading site 50, the management control section 312 generates the in-area route in the loading site 50. In FIG. 5, sections 60, 63 indicate the conveyance route, sections 61a, 61b indicate the area entrance side route, and a section 62 indicates the area exit side route. The conveyance route is set based on the conveyance path map information that is set be connected to the loading site 50.

Although the details will be described later, the loading position node_LP is specified by the unmanned vehicle instruction section 313 based on the bucket tip position of the loading machine 10. When the loading position node_LP is specified, the management control section 312 generates the in-area map information for the unmanned vehicle 20 to travel based on the loading site entry point node_Lin, the loading site exit point node_Lout, and the loading position node_LP.

In the in-area map information generated by the management control section 312, the area entrance side route in particular may include a switchback point node_LR for switching the forward movement or the backward movement of the unmanned vehicle 20. The generation of the in-area map information is performed, for example, as disclosed in JP 2019-200462 A, by searching for an appropriate route based on an index such as the shortest route length from candidates made by combining straight lines and circular arcs, which are partial elements of a route, within a range in which the generation of the route is allowed in the work area.

Also in the dumping site, the management control section 312 similarly generates the in-area map information based on the specified dumping position. In this case, the dumping position may be specified by an operator of a bulldozer or the like working in the dumping site, or by an operator performing a remote operation in the management station.

Further, when generating the in-area map information, the management control section 312 notifies the dispatch management section 311 that the in-area map information has been newly generated. For example, when the in-area route is generated based on the loading position instructed as described above, the management control section 312 notifies the dispatch management section 311 that the in-area route has been newly generated. Then, when there is an unmanned vehicle 20 for which the conveyance route to the loading site is set as the travel route and the area entrance side route has not been set, the dispatch management section 311 sets the area entrance side route for the unmanned vehicle 20 based on the generated in-area map information.

The unmanned vehicle instruction section 313 calculates a loading zone of the unmanned vehicle 20 based on the information on the position, the orientation, and the tray dimension of the unmanned vehicle 20 transmitted from the vehicle information management section 211 of the unmanned vehicle 20. Further, the unmanned vehicle instruction section 313 issues a calling instruction and a departure instruction to the unmanned vehicle 20 based on the calculated loading zone and the bucket tip position transmitted from the machine information management section 112 of the loading machine 10.

In this embodiment, a sequence of processes including specifying the loading position to the management control section 312, generating the in-area map information based thereon, and setting the generated map information as the travel route to the loading position of the unmanned vehicle 20 is referred to as the "calling instruction" to the unmanned vehicle 20. A process of setting a new traveling route from the area exit side route in a state where the unmanned vehicle 20 stands by at the loading position until completion of the loading work is referred to as the "departure instruction" to the unmanned vehicle 20.

Specifically, when the management station 30 receives the unmanned vehicle operation instruction information from the machine information management section 112 of the loading machine 10, the unmanned vehicle instruction section 313 first calculates the loading zone of the unmanned vehicle 20, selects (in other words, determines) the calling instruction or the departure instruction to the unmanned vehicle 20 based on the calculated loading zone and the bucket tip position calculated by the bucket tip position calculator 111, and issues the selected instruction via the management control section 312.

When the calling instruction is issued, the unmanned vehicle instruction section 313 specifies the loading position to the management control section 312 and requests the calling instruction to the unmanned vehicle 20. The management control section 312 generates the in-area map information based on the specified loading position, and further works with the dispatch management section 311 to instruct the unmanned vehicle 20 to travel the area entrance side route to the loading position. On the other hand, when the departure instruction is issued, the unmanned vehicle instruction section 313 requests the departure instruction to the unmanned vehicle 20 from the management control section 312. The management control section 312 works with the dispatch management section 311 to instruct the unmanned vehicle 20 to travel the area exit side route to the loading site exit point and the conveyance route.

Figure 6:
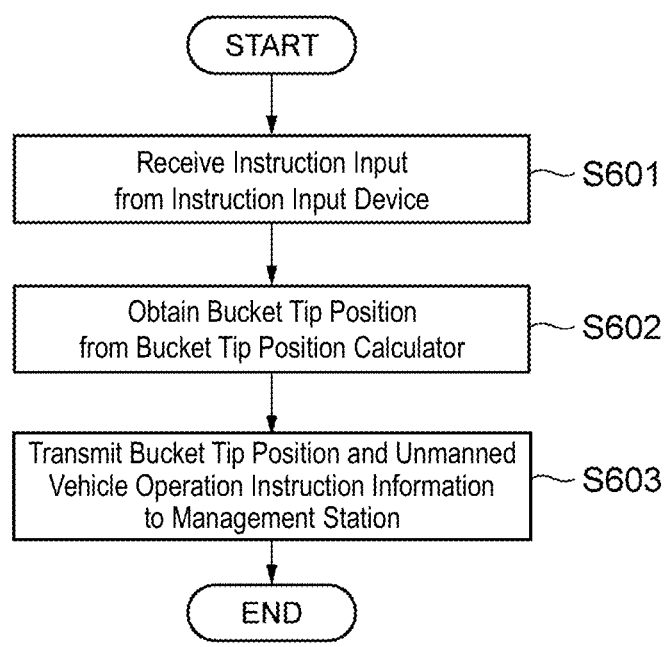
FIG. 6 is a flowchart showing process content of a loading machine information management device.

Next, process content of the loading machine information management device 11 of the loading machine 10 will be described with reference to FIG. 6 and FIG. 7. FIG. 6 is a flowchart showing the process content of the loading machine information management device, and FIG. 7 is a diagram for describing a calculation of the bucket tip position of the bucket in the loading machine.

As shown in FIG. 6, when an operator of the loading machine 10 operates the instruction input device 15, the machine information management section 112 receives an instruction input from the instruction input device 15 (Step S601). Subsequently, the machine information management section 112 obtains the bucket tip position at that point from the bucket tip position calculator 111 (Step S602).

Figure 7:
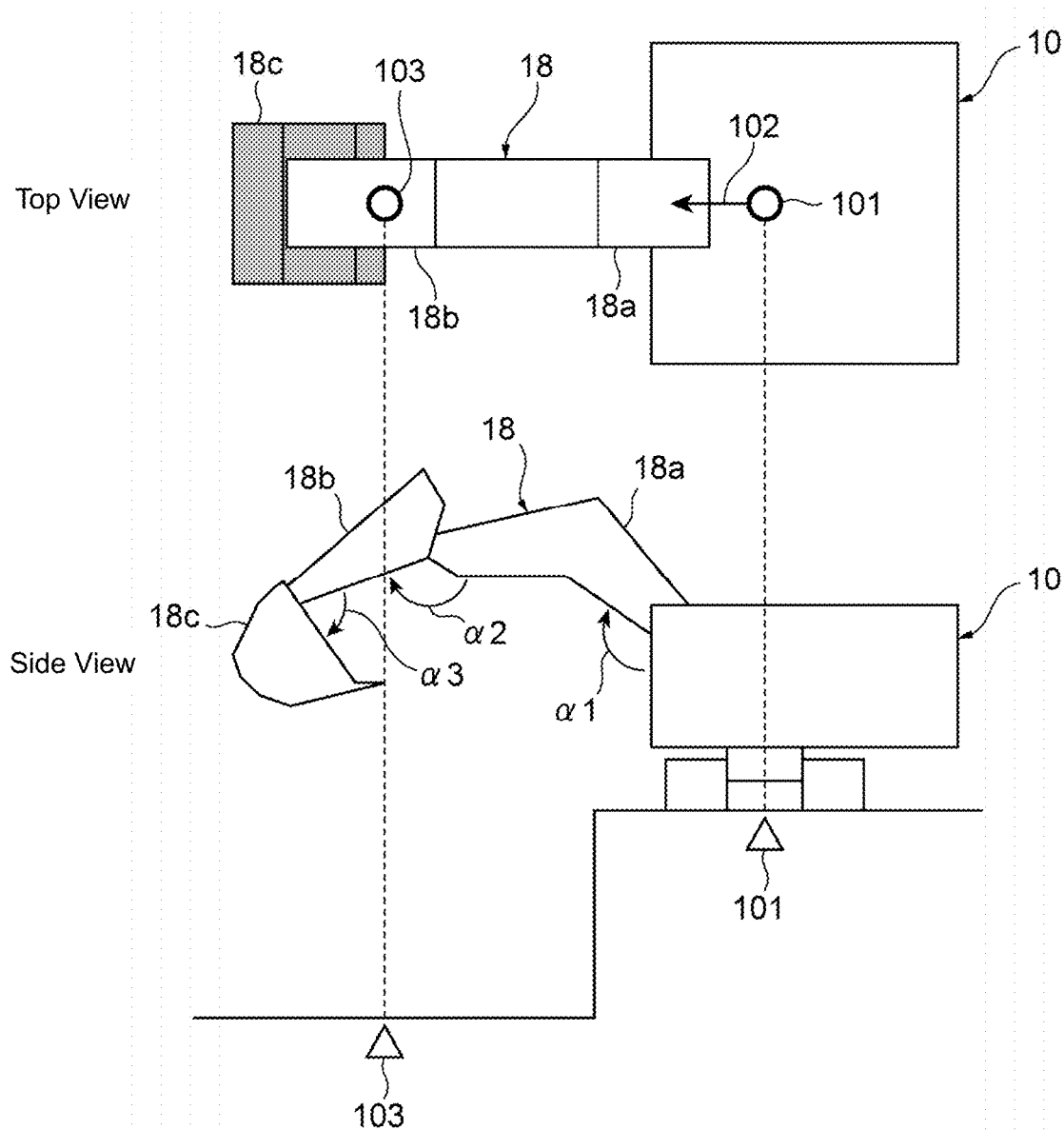
FIG. 7 is a diagram for describing a calculation of a bucket tip position of a bucket in the loading machine.

As shown in FIG. 7, a bucket tip position 103 of the bucket is calculated by the bucket tip position calculator 111 based on the information on a position 101, an orientation 102, and an angle of each joint α1, α2, α3 of the loading machine 10. The position 101 of the loading machine 10 is measured by the loading machine position sensor 12, and the orientation 102 of the loading machine 10 is measured by the loading machine orientation sensor 13. A working device 18 of the loading machine 10 includes a boom 18a, an arm 18b, and a bucket 18c. The angle α1 is a relative angle between the machine main body and the boom 18a, the angle α2 is a relative angle between the boom 18a and the arm 18b, and the angle α3 is a relative angle between the arm 18b and the bucket 18c. These angles are each measured by the working device angular sensor 14. Here, α1, α2, α3 are collectively referred to as "working device angles."

The bucket tip position calculator 111 uses the information on the position 101, the orientation 102, and the working device angles α1, α2, α3 of the loading machine 10 and the dimension of the working device to geometrically calculate the bucket tip position 103 as the center position of the cutting edge when the bucket 18c excavates the earth and sand. Subsequently, the bucket tip position calculator 111 outputs the calculated bucket tip position to the machine information management section 112. This allows the machine information management section 112 to obtain the bucket tip position.

Subsequently, the machine information management section 112 transmits the obtained bucket tip position and the unmanned vehicle operation instruction information to the management station 30 via the loading machine wireless communication device 16 (Step S603).

Figure 8:
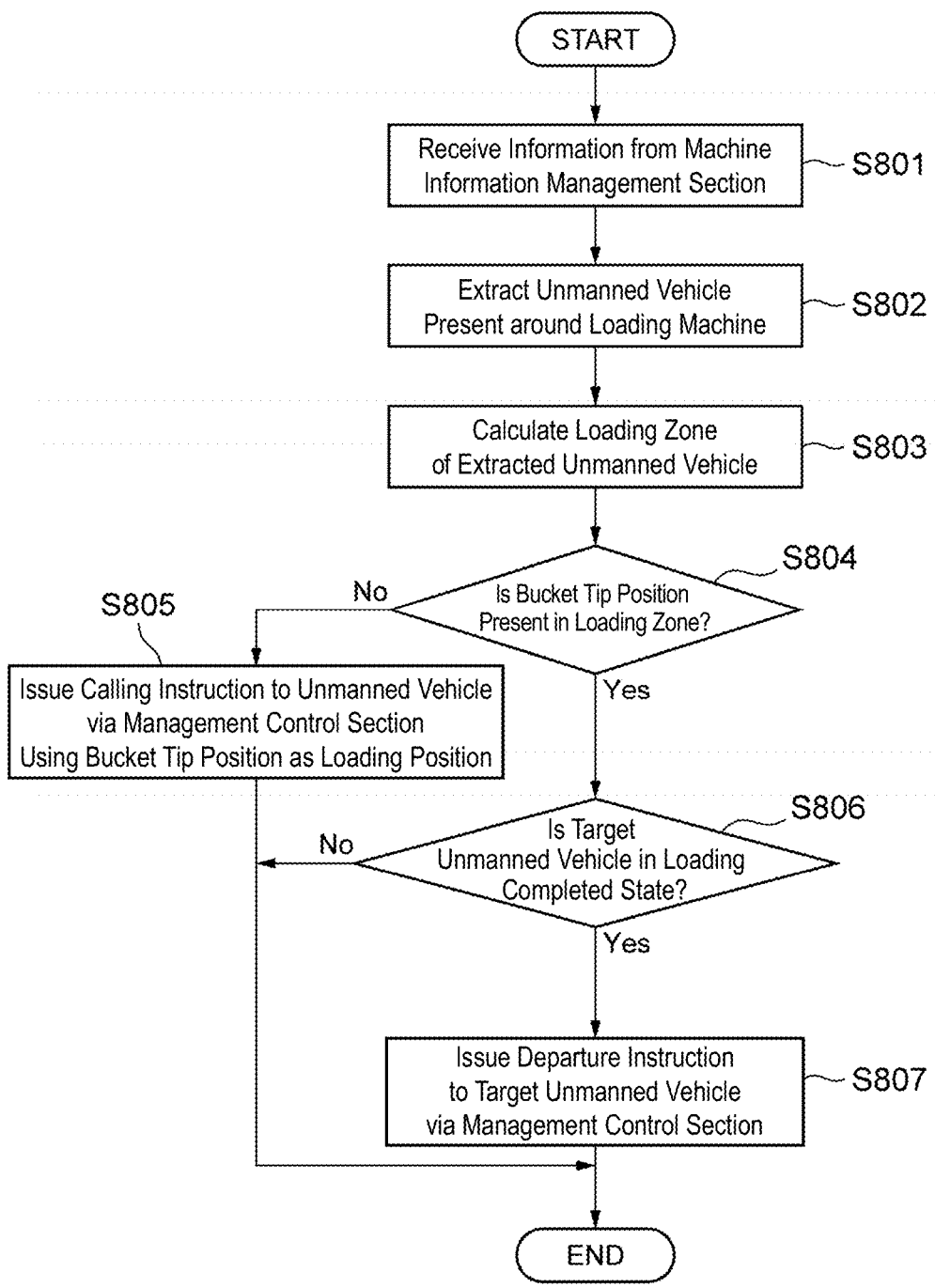
FIG. 8 is a flowchart showing process content of a management control device.
Figure 9:
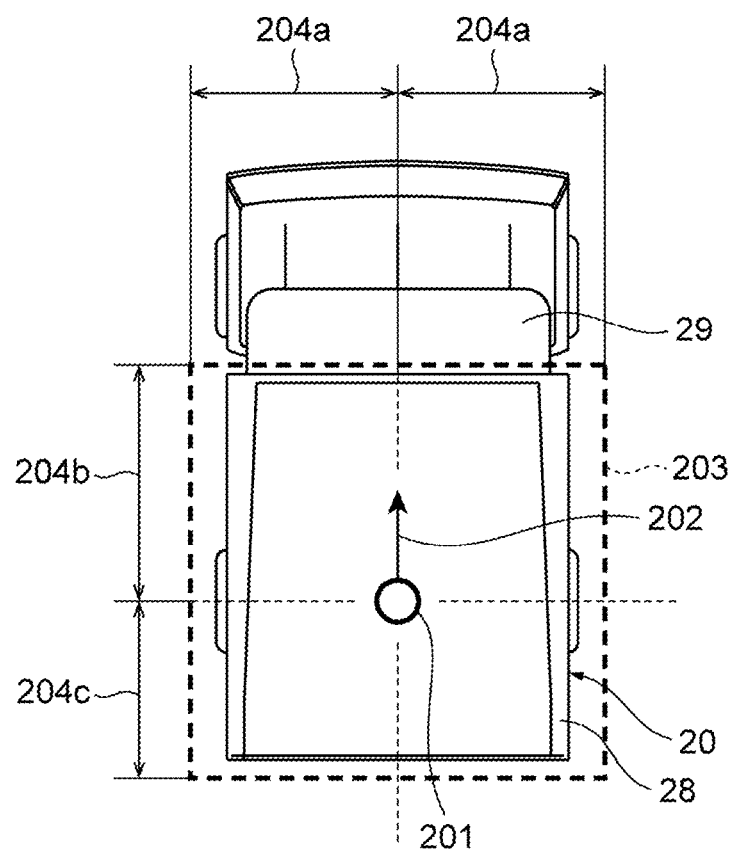
FIG. 9 is a diagram for describing a loading zone of an unmanned vehicle.
Figure 10:
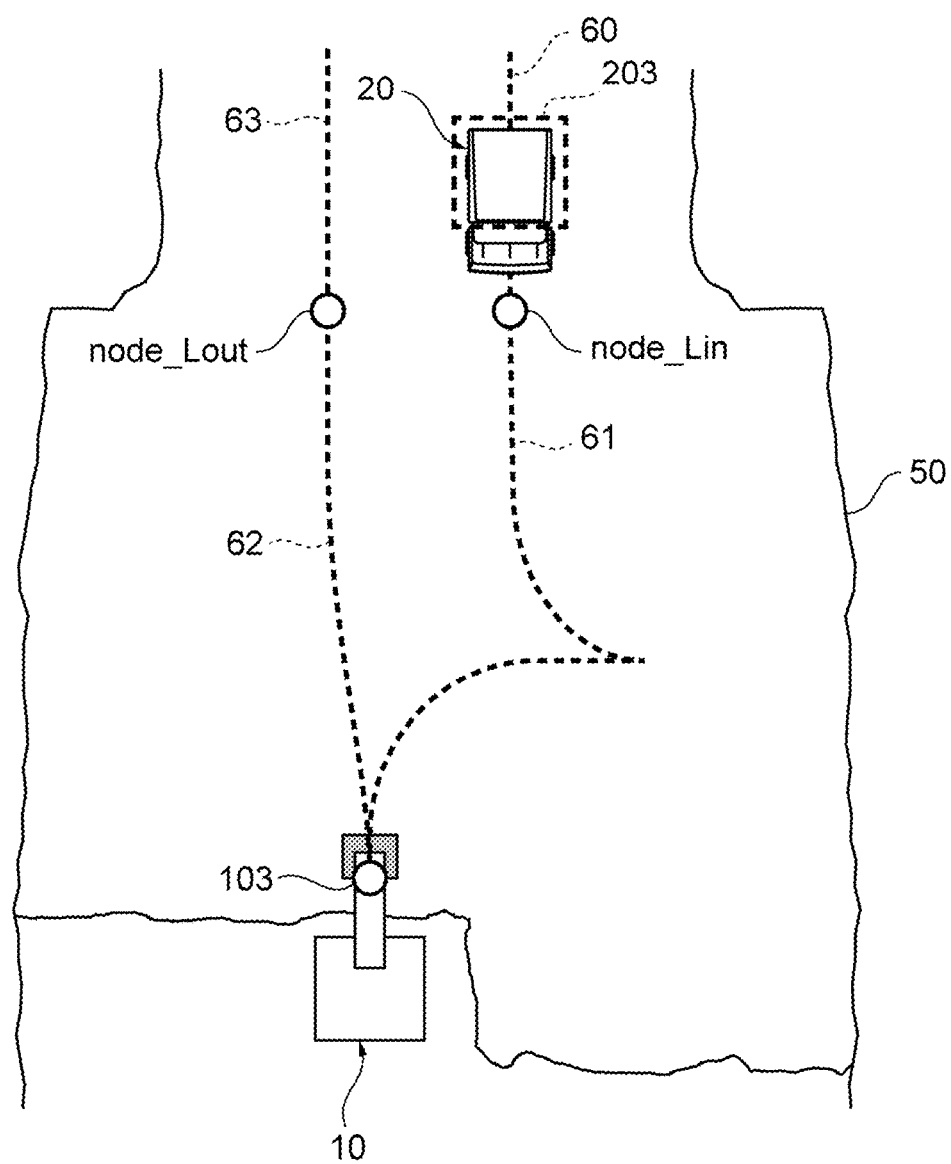
FIG. 10 is a diagram for describing a situation where a calling instruction is issued to the unmanned vehicle.
Figure 11:
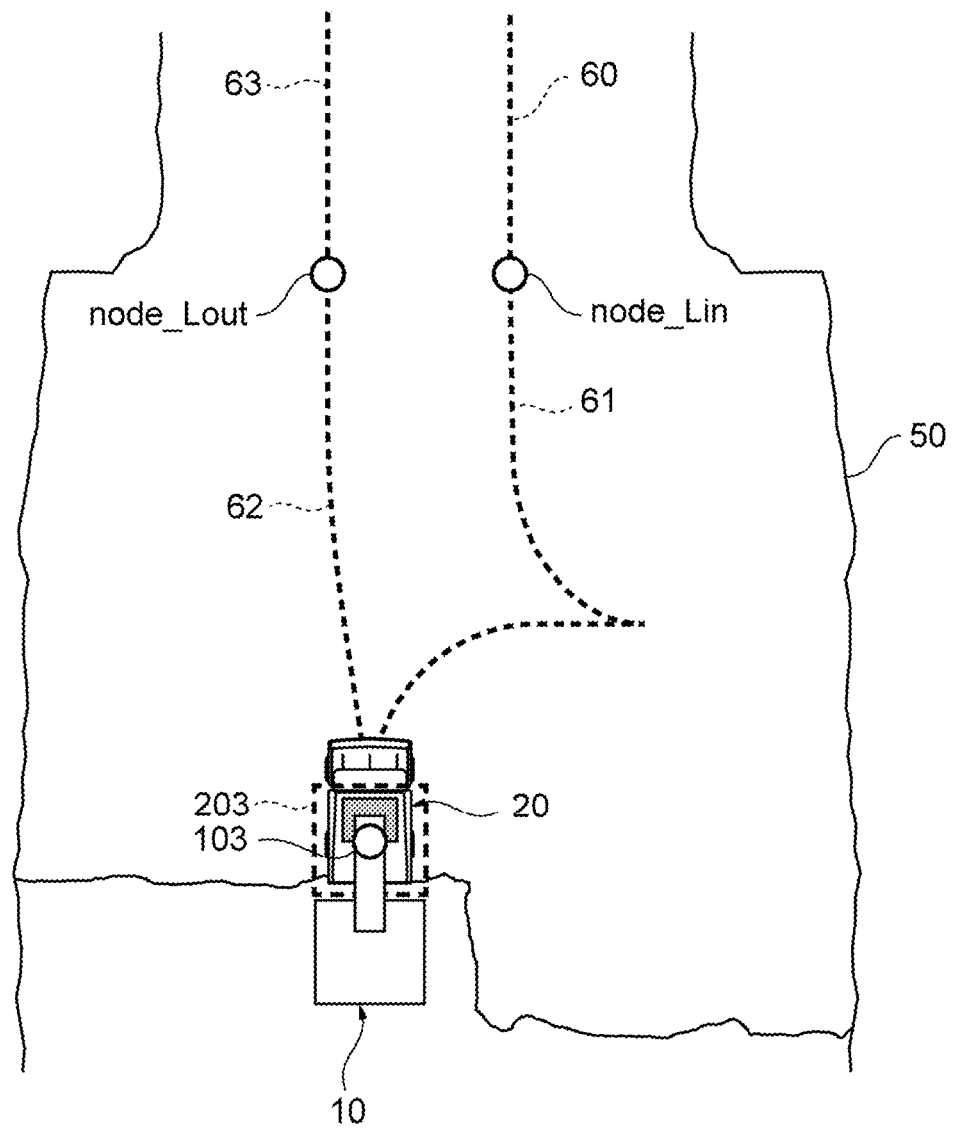
FIG. 11 is a diagram for describing a situation where a departure instruction is issued to the unmanned vehicle.

Next, process content of the management control device 31 of the management station 30 will be described with reference to FIG. 8 to FIG. 11. FIG. 8 is a flowchart showing the process content of the management control device, and FIG. 9 is a diagram for describing the loading zone of the unmanned vehicle. FIG. 10 is a diagram for describing a situation where the calling instruction is issued to the unmanned vehicle, and FIG. 11 is a diagram for describing a situation where the departure instruction is issued to the unmanned vehicle.

As shown in FIG. 8, first, the unmanned vehicle instruction section 313 receives information transmitted from the machine information management section 112 via the management station wireless communication device 33 (Step S801). Subsequently, the unmanned vehicle instruction section 313 extracts the unmanned vehicle 20 present around the loading machine 10 based on the position of the loading machine 10 and the position of the unmanned vehicle 20 (Step S802). An extraction method may include extracting the unmanned vehicle 20 present within a predetermined range from the position of the loading machine 10, or extracting the unmanned vehicle 20 in which the travel route is set with the loading site where the loading machine 10 is present as a destination. One or a plurality of the unmanned vehicles may be extracted.

Subsequently, the unmanned vehicle instruction section 313 calculates the loading zone of each of the extracted unmanned vehicles 20 (Step S803). Here, the calculation of the loading zone of the unmanned vehicle 20 will be described in detail with reference to FIG. 9. The unmanned vehicle instruction section 313 repeatedly receives a reference position 201, an orientation 202 and the tray dimension of the unmanned vehicle 20 transmitted from the vehicle information management section 211 of the unmanned vehicle 20 at a predetermined cycle (for example, 0.5 seconds).

The reference position 201 of the unmanned vehicle 20 is, for example, the center position of the rear wheel axle of the unmanned vehicle 20, and is measured by the unmanned vehicle position sensor 23. The orientation 202 of the unmanned vehicle 20 is, for example, an orientation indicating the front of the unmanned vehicle 20, and is measured by the unmanned vehicle orientation sensor 24. As shown by a dashed line in FIG. 9, a loading zone 203 is a zone obtained by projecting a space surrounding an entirety of a tray 28 of the unmanned vehicle 20 onto the ground surface. Note that the loading zone 203 does not include a canopy 29 coupled to a forward end part of the tray 28. The loading zone 203 is calculated by the unmanned vehicle instruction section 313, using the reference position 201 and the orientation 202 as well as a tray width parameter 204a, a tray front length parameter 204b, and a tray rear length parameter 204c, which are stored in the vehicle information management section 211 as the tray dimension of the unmanned vehicle 20. The tray front length parameter 204b and the tray rear length parameter 204c are parameters based on the reference position 201. The tray width parameter 204a is a length from the reference position 201 as the center to the most protruding portion of the tray in the width direction. The tray front length parameter 204b is a length from the reference position 201 to the front end of the tray, and the tray rear length parameter 204c is a length from the reference position 201 to the rear end of the tray. These parameters are unique to each vehicle ID.

Subsequently, the unmanned vehicle instruction section 313 determines whether or not the bucket tip position is present in the loading zone based on the calculated loading zones 203 of a plurality of the unmanned vehicles 20 and the bucket tip position 103 of the loading machine 10 transmitted from the machine information management section 112 (Step S804).

When the bucket tip position is determined not to be present in the loading zone of any of the unmanned vehicles 20, the unmanned vehicle instruction section 313 issues the calling instruction to the unmanned vehicle 20 via the management control section 312 using the bucket tip position as the loading position (Step S805). That is, as described above, the unmanned vehicle instruction section 313 specifies the bucket tip position of the loading machine 10 as the loading position. The management control section 312 generates the in-area map information based on the specified bucket tip position, and further works with the dispatch management section 311 to set the travel route to the loading position for the unmanned vehicle 20.

Here, a situation where the calling instruction is issued to the unmanned vehicle will be described with reference to FIG. 10. FIG. 10 shows a state where the area entrance side route in the loading site is not set and the unmanned vehicle 20 is standing by at the terminating end of the conveyance route 60.

The management control section 312 generates the map information on a section 61 on the area entrance side and the section 62 on the area exit side as the in-area map information based on the loading position specified by unmanned vehicle instruction section 313. Further, the management control section 312 works with the dispatch management section 311 and sets the section 61 of the generated in-area map information as the area entrance side route of the unmanned vehicle 20. Subsequently, the management control section 312 transmits the calling instruction and the set area entrance side route to the unmanned vehicle 20 via the management station wireless communication device 33.

In the unmanned vehicle 20, the unmanned vehicle control device 21 receives the set area entrance side route and the calling instruction via the unmanned vehicle wireless communication device 27, and causes the unmanned vehicle 20 to travel via the travel driving device 22. As a result, the unmanned vehicle 20 travels following the section 61 (that is, the set area entrance side route), and stops at the loading position set based on the bucket tip position of the loading machine 10. This allows the loading machine 10 to call the unmanned vehicle 20 to the position where the loading work can be performed, based on the bucket tip position specified by the operator of the loading machine 10.

On the other hand, when the bucket tip position is determined to be present in any of the loading zones in Step S804, the unmanned vehicle instruction section 313 further determines whether or not the target unmanned vehicle 20 is in a loading completed state from the loaded amount of the target unmanned vehicle 20 (Step S806). At this time, the unmanned vehicle instruction section 313 sets, for example, a threshold for the loaded amount in advance, and determines that the target unmanned vehicle 20 is in the loading completed state when the loaded amount exceeds the threshold.

When the target unmanned vehicle 20 is determined not to be in the loading completed state, the sequence of the processes is terminated. On the other hand, when the target unmanned vehicle 20 is determined to be in the loading completed state, the unmanned vehicle instruction section 313 issues the departure instruction to the target unmanned vehicle 20 via the instruction management control section 312 (Step S807). At this time, the management control section 312 works with the dispatch management section 311 to set at least the area exit side route corresponding to the loading position at which the unmanned vehicle 20 is stopped and the conveyance route to the next destination as a new travel route.

Here, a situation where the departure instruction is issued to the unmanned vehicle will be described in detail with reference to FIG. 11. In FIG. 11, it is assumed that the loading machine 10 is in a state after the completion of the loading work for the unmanned vehicle 20, and the unmanned vehicle 20 is in the loading completed state.

When the operator operates the instruction input device 15 simultaneously with the completion of the loading work, the bucket tip position 103 is in a state of being present in the loading zone of the unmanned vehicle 20. In view of this, the unmanned vehicle instruction section 313 requests the departure instruction to the target unmanned vehicle 20 from the management control section 312. The management control section 312 works with the dispatch management section 311 to set the section 62, which is a part of the generated in-area map information, as the area exit side route of the travel route of the unmanned vehicle 20 and set the section 63 as the subsequent conveyance route. Subsequently, the management control section 312 transmits the calling instruction, the set area exit side route and conveyance route to the unmanned vehicle 20 via the management station wireless communication device 33.

In the unmanned vehicle 20, the unmanned vehicle control device 21 receives the calling instruction, the set area exit side route and conveyance route via the unmanned vehicle wireless communication device 27, and causes the unmanned vehicle 20 to travel via the travel driving device 22. As a result, the unmanned vehicle 20 starts traveling following the section 62 (that is, the set area exit side route). This allows the loading machine 10 to start moving the unmanned vehicle 20 in consideration of the state after the loading is completed based on the bucket tip position of the loading machine 10.

In the vehicle management system 1 of this embodiment, the unmanned vehicle instruction section 313 of the management station 30 issues the calling instruction or the departure instruction to the unmanned vehicle 20 based on the bucket tip position calculated from the information on the position, the orientation and the working device angle of the loading machine 10 and the loading zone of the unmanned vehicle 20 calculated from the position, the orientation and the tray dimension of the unmanned vehicle 20. This reduces the workload of the operator of the loading machine 10, and thus improves efficiency of the loading work for the unmanned vehicle 20 by the operator of the loading machine 10.

When the operator of the loading machine 10 wants to call the unmanned vehicle 20 to the specified position, in a state where the bucket tip position of the bucket is not present in the loading zone of the unmanned vehicle 20, the operation to the instruction input device 15 by the operator specifies the bucket tip position at the point as the loading position, and the calling instruction to the unmanned vehicle 20 is issued. This allows the unmanned vehicle 20 to travel to the specified loading position and stop, and thus the loading work for the unmanned vehicle 20 can be performed efficiently. Although the working position of the loading machine 10 constantly changes according to progress of the excavation work or the loading work, the operator can specify the bucket tip position of the bucket as the loading position and cause the unmanned vehicle 20 to travel to the specified loading position and stop by simply operating the instruction input device 15. Therefore, the workload of the operator can be reduced and efficiency of the loading work for the unmanned vehicle 20 can be further improved.

At the point when the loading work is completed, in a state where the bucket tip position of the bucket is present in the loading zone of the unmanned vehicle 20, the operation to the instruction input device 15 by the operator issues the departure instruction to the unmanned vehicle 20. This allows for an efficient instruction to the unmanned vehicle 20 after the completion of the loading work to start moving. Therefore, even with the same operation (operation to the instruction input device 15) by the operator of the loading machine 10, the unmanned vehicle instruction section 313 can issue the calling instruction or the departure instruction to the unmanned vehicle 20 based on the bucket tip position and the loading zone of the unmanned vehicle 20, and thus efficiency of the loading work can be improved.

Further, since the above-described calling instruction or departure instruction is issued by the same operation by the operator of the loading machine 10 and the operation by the operator's input is simple, the erroneous operation caused by an unfamiliar operator in a conventional case can be avoided. As a result, the loading work can be performed more smoothly.

Second Embodiment

Next, the second embodiment of the vehicle management system will be described with reference to FIG. 12 and FIG. 13. The vehicle management system of the second embodiment is different from that of the first embodiment described above in that the departure instruction is issued to the unmanned vehicle 20 based on the bucket tip position the loading zone of the unmanned vehicle 20 even when there is no input to the instruction input device 15 by the operator. Other configurations and processes are similar to those of the first embodiment, and therefore repeated explanations will be omitted. The following describes only the difference.

In this embodiment, even when there is no input (in other words, the operation to the instruction input device 15) to the instruction input device 15 by the operator, the machine information management section 112 of the loading machine 10 repeatedly transmits the information on the bucket tip position to the management station 30 at a predetermined cycle (for example, 0.5 seconds).

Figure 12:
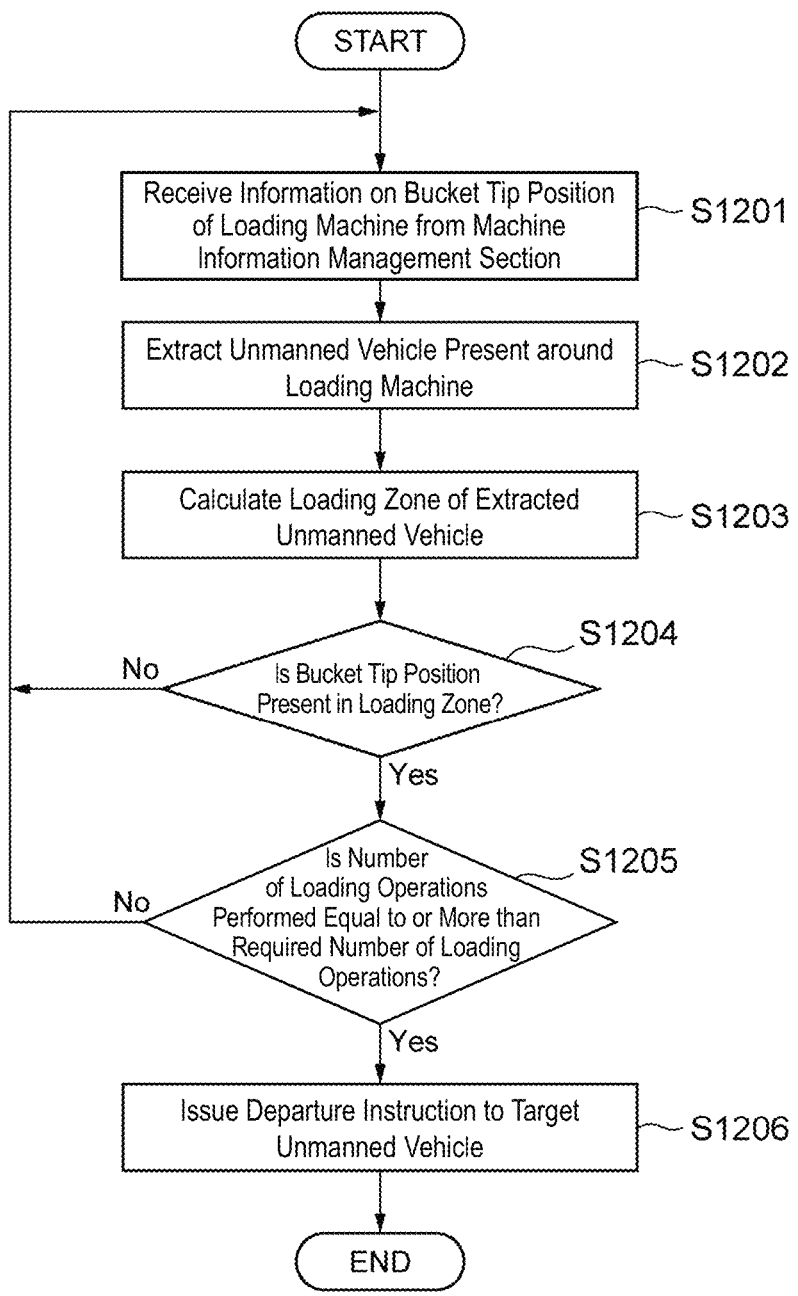
FIG. 12 is a flowchart showing process content of a management control device in a second embodiment.

FIG. 12 is a flowchart showing process content of the management control device in the second embodiment. As shown in FIG. 12, first, the unmanned vehicle instruction section 313 receives the information on the bucket tip position of the loading machine 10 transmitted from the machine information management section 112 (Step S1201). Subsequently, similarly to Steps S802 to S804 described in the first embodiment, the unmanned vehicle instruction section 313 extracts the unmanned vehicle 20 present around the loading machine 10 (Step S1202), calculates the loading zone of the extracted unmanned vehicle (Step S1203), and determines whether or not the bucket tip position is present in the loading zone (Step S1204). Then, when the bucket tip position is determined not to be in the loading zone, the process returns to Step S1201.

On the other hand, when the bucket tip position is determined to be present in the loading zone, the unmanned vehicle instruction section 313 further determines whether or not the number of loading operations performed by the loading machine 10 is equal to or more than the required number of loading operations (Step S1205). Then, when the number of loading operations performed is determined to be equal to or more than the required number of loading time, the unmanned vehicle instruction section 313 transmits the departure instruction to the target unmanned vehicle 20 via the management control section 312 (Step S1206). On the other hand, when the number of loading operations performed is determined not to be equal to or more than the required number of loading operations, the process returns to Step S1201.

Whether or not the number of loading operations performed is equal to or more than the required number of loading operations is determined based on, for example, the number of movements of the bucket tip position in a separating direction away from the loading machine 10 within a predetermined height range set according to the type of the unmanned vehicle 20. Hereinafter, a detailed description will be given based on FIG. 13.

Figure 13:
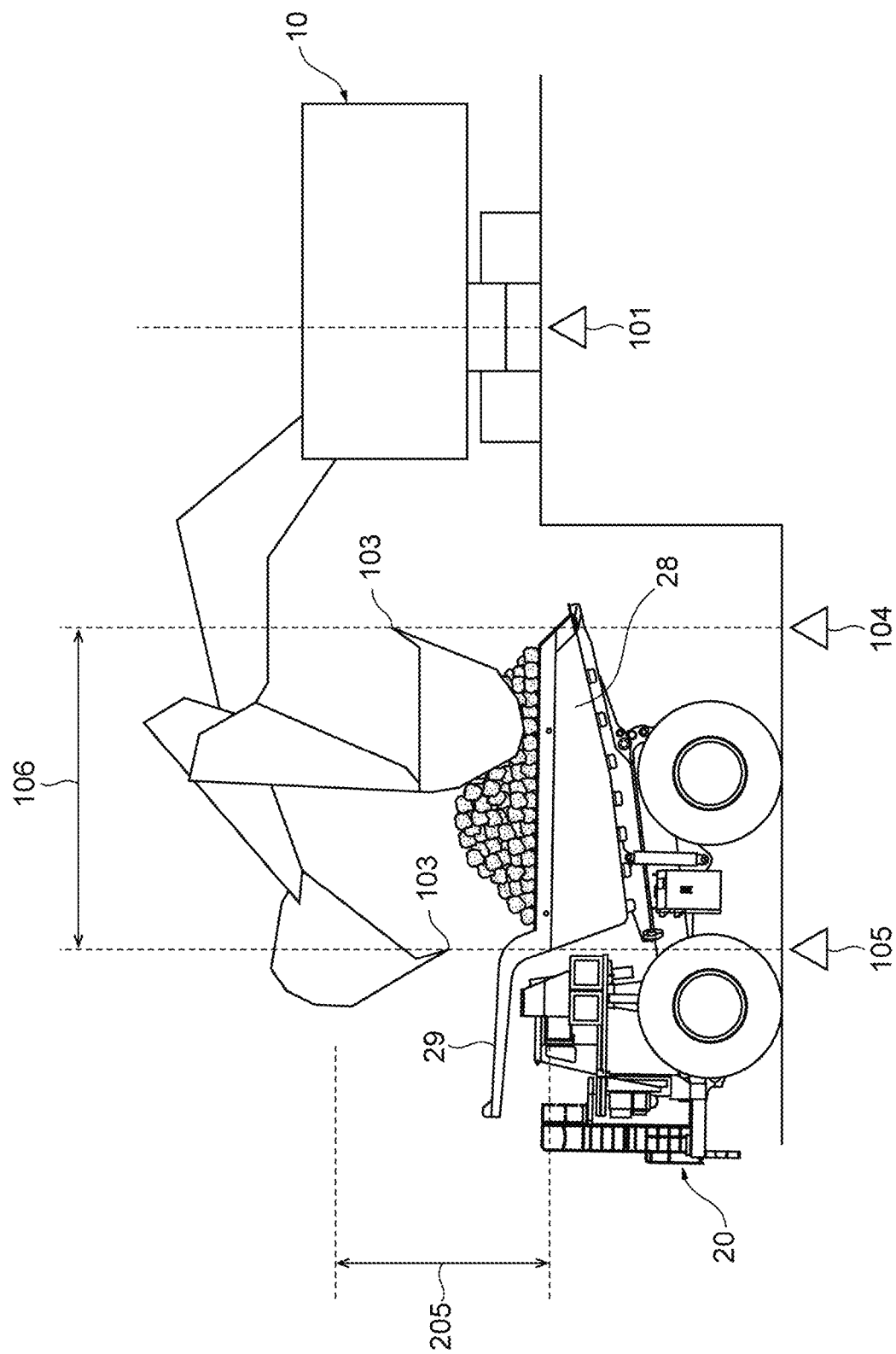
FIG. 13 a diagram for describing the situation where the departure instruction is issued to the unmanned vehicle.

In the state shown in FIG. 13, the bucket tip position 103 is present in the loading zone of the unmanned vehicle 20 within a predetermined height range 205 in which the height of the bucket tip position 103 is based on the height of the tray of the unmanned vehicle 20. The predetermined height range is set according to the type of the unmanned vehicle 20, based on height information included in the position information on the unmanned vehicle 20. The predetermined height range may be offset in consideration of the load of the tray.

As a bucket tip position movement distance 106, the unmanned vehicle instruction section 313 first calculates a difference between a bucket tip position movement start point 104, which is the point closest to the loading machine 10 in the horizontal direction, and a bucket tip position movement end point 105, which is the point farthest from the loading machine 10 in the horizontal direction from the history of the bucket tip positions that have been obtained and accumulated. Subsequently, the unmanned vehicle instruction section 313 compares the calculated bucket tip position movement distance 106 with a preliminarily set distance threshold (for example, 3 meters). When the bucket tip position movement distance 106 exceeds the distance threshold, it is determined that the loading operation has been performed since the bucket tip position has moved in the separating direction away from the loading machine 10.

When the number of movements in the separating direction away from the loading machine 10 has reached or exceeded a predetermined number of times (for example, 4 times), the unmanned vehicle instruction section 313 determines that the number of loading operations performed for the unmanned vehicle 20 by the loading machine 10 is equal to or more than the required number of loading operations and the loading work has been completed.

Here, the required number of loading operations is set by the unmanned vehicle instruction section 313 according to the types of the loading machine 10 and the unmanned vehicle 20. For example, the unmanned vehicle instruction section 313 preliminarily stores a table in which a vehicle ID indicating the type of the loading machine 10 is associated with the capacity of the bucket and a vehicle ID indicating the type of the unmanned vehicle 20 is associated with the capacity of the tray, obtains the capacities of the bucket and the tray based on the IDs of the target loading machine 10 and unmanned vehicle 20, and sets the required number of loading operations based on the obtained capacities. Thus, the required number of loading operations can be set more precisely.

The specific content of is the departure instruction in Step S1206 is similar to that of the first embodiment.

The vehicle management system of this embodiment further provides the following operational advantages in addition to the operational advantages similar to those of the first embodiment. That is, without input to the instruction input device 15 by the operator of the loading machine 10, the unmanned vehicle instruction section 313 can issue the departure instruction to the unmanned vehicle 20 based on the bucket tip position of the loading machine 10 and the loading zone of the unmanned vehicle 20. Thus, even though the operator of the loading machine 10 does not exclusively operate the unmanned vehicle 20, the departure instruction is automatically issued to the unmanned vehicle 20 by simply performing the ordinary loading work. This further reduces the workload of the operator, and thus further enhances efficiency of loading work for the unmanned vehicle 20.

Third Embodiment

Next, the third embodiment of the vehicle management system will be described with reference to FIG. 14 and FIG. 15. The vehicle management system of the third embodiment is different from that of the first embodiment described above in that even if the operator forgets to input the departure instruction to the instruction input device 15 after the completion of the loading work, the departure instruction is reliably issued. Other configurations and processes are similar to those of the first embodiment, and therefore repeated explanations will be omitted. The following describes only the difference.

In this embodiment, the machine information management section 112 of the loading machine 10 obtains and stores the information on the working device angle in addition to the bucket tip position, and transmits the information on the bucket tip position and the working device angle to the management station 30 via the loading machine wireless communication device 16.

Figure 14:
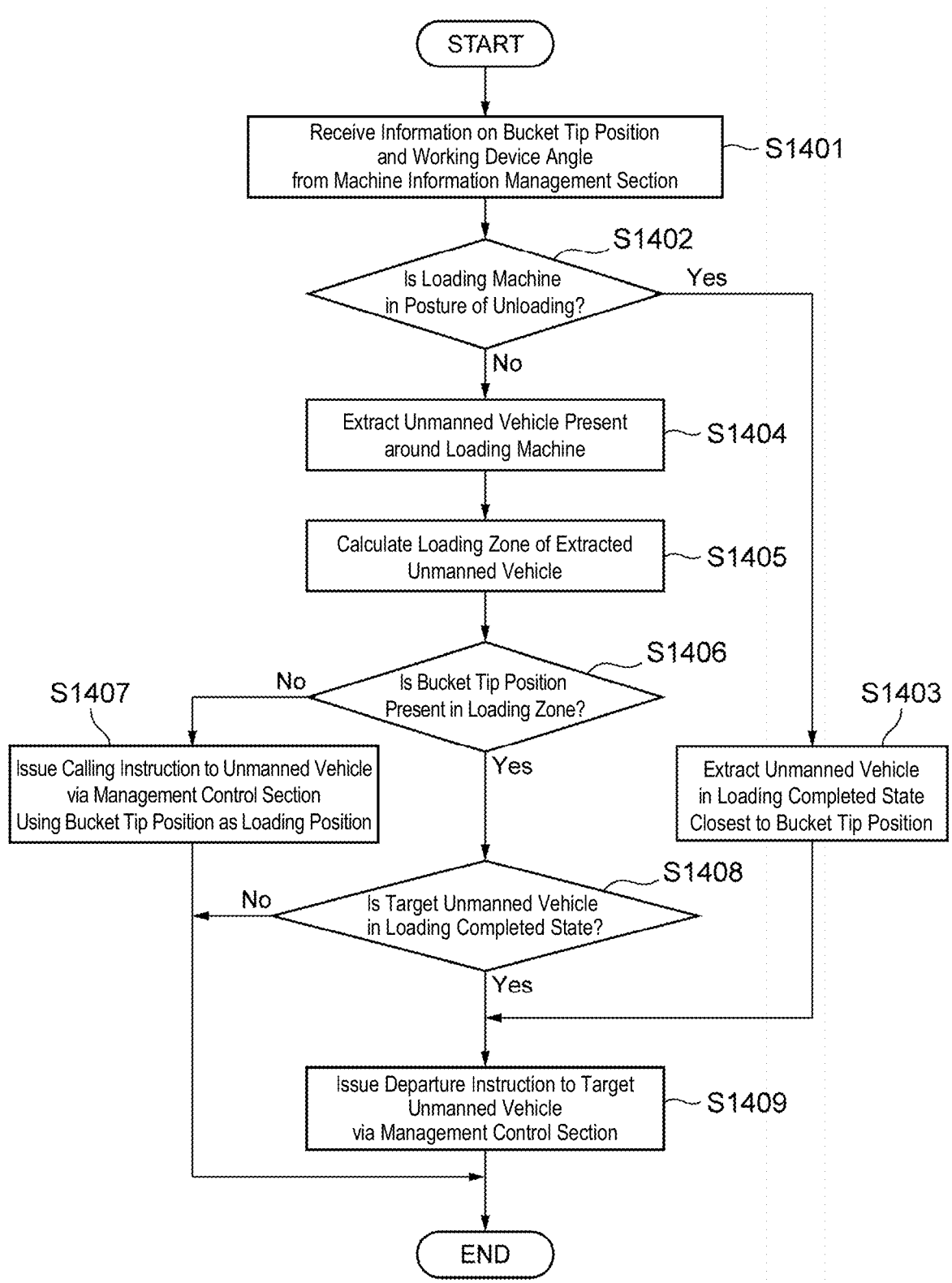
FIG. 14 is a flowchart showing process content of a management control device in a third embodiment.

FIG. 14 is a flowchart showing process content of the management control device in the third embodiment. As shown in FIG. 14, first, the unmanned vehicle instruction section 313 receives the information on the bucket tip position and the working device angle transmitted from the machine information management section 112 (Step S1401).

Subsequently, the unmanned vehicle instruction section 313 determines whether or not the loading machine 10 is in a posture of unloading (for example, a posture to open the bucket) based on the received working device angle (Step S1402). Here, in the case where the loading machine 10 is a backhoe, when a relative angle α3 between the bucket and the arm is equal to or greater than a preliminary set angle threshold, the unmanned vehicle instruction section 313 determines the loading machine 10 to be in the posture of unloading. In the case where the loading machine 10 is a front shovel excavator, since an opening is provided in the lower portion of the bucket and unloading is performed by opening the opening, the unmanned vehicle instruction section 313 determines the loading machine 10 to be in the posture of unloading when an angle of the opening is equal to or greater than the predetermined threshold.

In Step S1402, when the loading machine 10 is determined to be in the posture of unloading, the unmanned vehicle instruction section 313 extracts the unmanned vehicle 20 in the loading completed state closest to the bucket tip position of the loading machine 10 in the same way as in Step S802 described in the first embodiment (Step S1403).

Here, the processes in Step S1402 and S1403 will be further described with reference to FIG. 15. The upper portion of FIG. 15 is a diagram for describing a situation where the loading machine has completed the loading work for the unmanned vehicle. In the upper portion of FIG. 15 shows a situation where the loading machine 10 has completed the loading work for the unmanned vehicle 20, and the operator has moved the bucket tip position 103 to the outside of the loading zone 203 of the unmanned vehicle 20 without operating the instruction input device 15, that is, without issuing the departure instruction to the unmanned vehicle 20.

The lower portion of FIG. 15 is a diagram for describing a state of the loading machine that issues the departure instruction to the unmanned vehicle. As shown in the lower portion of FIG. 15, the loading machine 10 is in a posture in which the relative angle α3 between the bucket and the arm is equal to or greater than the angle threshold (for example, equal to or greater than 25 degrees close to 30 degrees of full opening). At this time, the unmanned vehicle instruction section 313 determines the loading machine 10 to be in the posture of unloading (Step S1402), and extracts the unmanned vehicle 20 in the loading completed state closest to the bucket tip position 103 (Step S1403). Subsequently, the unmanned vehicle instruction section 313 issues the departure instruction to the extracted vehicle (Step S1409).

On the other hand, when the loading machine 10 is determined not to be in the posture of unloading in Step S1402, the unmanned vehicle instruction section 313 extracts the unmanned vehicle present around the loading machine 10 similarly to Step S802 described in the first embodiment (Step S1404). In Steps S1405 to S1409 subsequent to Step S1404, the same processes as in Steps S803 to S807 described in the first embodiment are performed.

The vehicle management system of this embodiment further provides the following operational advantages in addition to the operational advantages similar to those of the first embodiment. That is, even in the case where the operator forgets to input the departure instruction to the instruction input device 15 after the completion of the loading work, the unmanned vehicle instruction section 313 issues the departure instruction to the unmanned vehicle 20 when the loading machine 10 is determined to be in the posture of unloading based on the relative angle α3 between the bucket and the arm. This allows the operator to reliably issue the departure instruction to the unmanned vehicle 20 only by placing the loading machine 10 in the posture of unloading on the spot, in other words, only by performing the minimum operation such as opening the bucket, without performing an operation of returning the bucket tip position to the loading zone of the unmanned vehicle 20.

While the embodiments of the present invention have been described in detail above, the present invention is not limited to the above-described embodiments and can be subjected to various kinds of design changes without departing from the spirit of the present invention described in the claims. For example, the vehicle information management section and the autonomous traveling control section are not necessarily disposed in the unmanned vehicle, and may be disposed in, for example, an external server device or the like configured to be able to communicate with each of the unmanned vehicle and the management station. The bucket tip position calculator and the machine information management section are not necessarily disposed in the loading machine, and may be disposed in, for example, an external server device or the like configured to be able to communicate with each of the loading machine and the management station.

REFERENCE SIGNS LIST

1 Vehicle management system
10 Loading machine
11 Loading machine information management device
12 Loading machine position sensor
13 Loading machine orientation sensor
14 Working device angular sensor
15 Instruction input device
16 Loading machine wireless communication device
20 Unmanned vehicle
21 Unmanned vehicle control device
22 Travel driving device
23 Unmanned vehicle position sensor
24 Unmanned vehicle orientation sensor
25 Load sensor
26 Unmanned vehicle storage device
27 Unmanned vehicle wireless communication device
28 Tray
29 Canopy
30 Management station
31 Management control device
32 Management station storage device
33 Management station wireless communication device
40 Wireless communication line
111 Bucket tip position calculator
112 Machine information management section
211 Vehicle information management section
212 Autonomous traveling control section
261 Map information storage section
311 Dispatch management section
312 Management control section
313 Unmanned vehicle instruction section
321 Dispatch management information storage section 322 Management information storage section
323 Map information storage section

The invention claimed is:

1. A vehicle management system in which an unmanned vehicle, a loading machine, and a management station are configured to be communicative with one another, the unmanned vehicle being capable of autonomous traveling, a bucket being mounted on the loading machine by an articulated structure, the loading machine performing a loading work for the unmanned vehicle, and the management station performing dispatch management and traffic control of the unmanned vehicle, the vehicle management system comprising:
    a vehicle information management section that obtains and stores information on a position, an orientation, and a tray dimension of the unmanned vehicle, and transmits the information to the management station;
    an autonomous traveling control section that controls a travel of the unmanned vehicle based on instruction from the management station;
    a bucket tip position calculator that calculates a bucket tip position of the bucket based on information on a position, an orientation, and an angle of each joint of the loading machine;
    a machine information management section that obtains and stores the bucket tip position calculated by the bucket tip position calculator, and transmits information on the bucket tip position to the management station; and
    an unmanned vehicle instruction section that calculates a loading zone obtained by projecting the tray of the unmanned vehicle onto a ground surface based on the information on the position, the orientation, and the tray dimension of the unmanned vehicle transmitted from the vehicle information management section, and issues a calling instruction or a departure instruction to the unmanned vehicle based on whether the bucket tip position transmitted from the machine information management section is in the calculated loading zone.

2. The vehicle management system according to claim 1, wherein the unmanned vehicle instruction section issues the calling instruction to the unmanned vehicle when the bucket tip position is not present in the loading zone of the unmanned vehicle.

3. The vehicle management system according to claim 2, wherein the unmanned vehicle instruction section issues the departure instruction to the unmanned vehicle when the bucket tip position is determined to be present in the loading zone of the unmanned vehicle and the unmanned vehicle is determined to be in a loading completed state based on a loaded amount of the unmanned vehicle.

4. The vehicle management system according to claim 1, wherein the loading machine further includes an instruction input device that allows an operator to input an instruction to the unmanned vehicle,
wherein when the instruction input device receives an instruction input, the machine information management section further generates operation instruction information to the unmanned vehicle in response to the instruction input, and transmits the generated operation instruction information together with the information on the bucket tip position to the management station.

5. The vehicle management system according to claim 1, wherein the unmanned vehicle instruction section issues the departure instruction to the unmanned vehicle when the bucket tip position is determined to be present in the loading zone of the unmanned vehicle and a number of loading operations performed by the loading machine is determined to be equal to or more than a required number of loading operations based on a number of movements of the bucket tip position in a separating direction away from the loading machine.

6. The vehicle management system according to claim 5, wherein the unmanned vehicle instruction section sets the required number of loading operations based on a capacity of the bucket of the loading machine and a capacity of the tray of the unmanned vehicle.

7. The vehicle management system according to claim 1, wherein the machine information management section further obtains and stores the information on the angle of each joint and transmits the information on the angle of each joint to the management station, and
wherein the unmanned vehicle instruction section issues the departure instruction to the unmanned vehicle closest to the bucket tip position when the loading machine is determined to be in a posture of unloading based on the information on the angle of each joint.

* * * * *